(12) United States Patent
Wilson

(10) Patent No.: US 7,578,315 B2
(45) Date of Patent: Aug. 25, 2009

(54) COMPOUND PIPE

(75) Inventor: Alexander Bruce Wilson, East Renfrewshire (GB)

(73) Assignee: Doosan Babcock Energy Limited, Renfrew (GB)

( * ) Notice: Subject to any disclaimer, the term of this patent is extended or adjusted under 35 U.S.C. 154(b) by 466 days.

(21) Appl. No.: 10/451,488

(22) PCT Filed: Dec. 21, 2001

(86) PCT No.: PCT/GB01/05696

§ 371 (c)(1),
(2), (4) Date: Sep. 12, 2003

(87) PCT Pub. No.: WO02/052184

PCT Pub. Date: Jul. 4, 2002

(65) Prior Publication Data

US 2005/0224127 A1    Oct. 13, 2005

(30) Foreign Application Priority Data

Dec. 22, 2000  (GB) ................................. 0031452.6
Apr. 4, 2001   (GB) ................................. 0108396.3

(51) Int. Cl.
- *F16L 11/12* (2006.01)
- *F16L 59/14* (2006.01)
- *F16L 59/16* (2006.01)
- *F16L 9/14* (2006.01)
- *F16L 9/18* (2006.01)

(52) U.S. Cl. ....................... 138/149; 138/112; 138/113; 285/47; 285/48; 285/49; 285/53

(58) Field of Classification Search ............... 285/47, 285/48, 49, 50, 53, 54; 138/112, 113, 149
See application file for complete search history.

(56) References Cited

U.S. PATENT DOCUMENTS

| 1,525,758 A | * | 2/1925 | Hockin .................... 285/47 |
| 2,348,754 A | | 5/1944 | Ray |
| 2,468,902 A | | 5/1949 | Villiger |
| 2,707,493 A | * | 5/1955 | Bonvillian et al. .......... 138/113 |
| 2,920,908 A | * | 1/1960 | Mitchell .................... 285/53 |
| 3,578,030 A | * | 5/1971 | Hatch ..................... 138/141 |
| 3,665,967 A | * | 5/1972 | Kachnik ................... 138/137 |
| 3,677,303 A | * | 7/1972 | Martin ..................... 285/47 |
| 3,693,665 A | * | 9/1972 | Veerling et al. ............ 138/149 |
| 3,698,440 A | * | 10/1972 | Matthieu et al. ........... 138/149 |
| 3,768,523 A | * | 10/1973 | Schroeder ................. 138/141 |
| 4,014,369 A | * | 3/1977 | Kobres, Jr. ................ 138/112 |
| 4,054,158 A | * | 10/1977 | Hoeman et al. ............ 138/155 |

(Continued)

FOREIGN PATENT DOCUMENTS

DE     1177432    10/1961

(Continued)

*Primary Examiner*—James M Hewitt
(74) *Attorney, Agent, or Firm*—Drinker Biddle & Reath LLP

(57) ABSTRACT

A compound pipe for conveying fluid comprising an inner pipe positioned within an outer pipe such that the walls of the inner pipe and outer pipe define a gap. The compound pipe further including an insulating material for insulating the inner pipe from the outer pipe, the insulating material and outer pipe defining a fluid channel.

24 Claims, 15 Drawing Sheets

U.S. PATENT DOCUMENTS

| | | | | |
|---|---|---|---|---|
| 4,221,405 A | * | 9/1980 | Stonitsch et al. | 285/53 |
| 4,363,504 A | * | 12/1982 | De Feo et al. | 285/47 |
| 4,371,197 A | * | 2/1983 | Chabrier | 285/47 |
| 4,465,307 A | * | 8/1984 | de Lange | 285/47 |
| 4,615,359 A | * | 10/1986 | Affa et al. | 138/104 |
| 4,660,861 A | * | 4/1987 | Argy et al. | 285/45 |
| 4,694,547 A | * | 9/1987 | Broussard | 29/890.149 |
| 4,694,864 A | * | 9/1987 | Libin | 138/113 |
| 4,700,751 A | * | 10/1987 | Fedrick | 138/149 |
| 4,705,138 A | | 11/1987 | Reese | |
| 4,788,090 A | * | 11/1988 | Marks et al. | 428/34.5 |
| 4,804,210 A | * | 2/1989 | Hancock | 285/47 |
| 5,072,591 A | * | 12/1991 | Grange et al. | 62/50.7 |
| 5,078,182 A | * | 1/1992 | Kraft | 138/147 |
| 5,421,724 A | * | 6/1995 | Facco | 432/236 |
| 5,441,083 A | * | 8/1995 | Korsgaard | 138/149 |
| 5,634,672 A | * | 6/1997 | Stack et al. | 285/54 |
| 5,658,024 A | * | 8/1997 | Bachmann et al. | 285/299 |
| 5,860,453 A | * | 1/1999 | Picking | 138/112 |
| 5,862,866 A | * | 1/1999 | Springer | 166/380 |
| 5,868,437 A | * | 2/1999 | Teague | 285/45 |
| 5,935,517 A | * | 8/1999 | Roll et al. | 422/9 |
| 6,199,595 B1 | * | 3/2001 | Baker | 138/149 |
| 6,328,346 B1 | * | 12/2001 | Masters et al. | 285/223 |
| 6,349,976 B1 | * | 2/2002 | Taylor, Jr. | 285/123.1 |

FOREIGN PATENT DOCUMENTS

| | | |
|---|---|---|
| DE | 1195113 | 5/1963 |
| EP | 0 318 232 A1 | 11/1988 |
| EP | 0 472 293 A1 | 7/1991 |
| FR | 1423113 | 11/1964 |
| GB | 1 450 138 | 12/1973 |

* cited by examiner

COMPOUND PIPE

This invention relates to a compound pipe and in particular to a compound pipe for conveying steam and to a method of constructing a compound pipe.

An important consideration when conveying fluids via piping is the choice of material for the piping. It is well known that carbon manganese steel normally used for steam piping is not adequate to convey fluids at temperatures above 480° C. Such steel will "creep" or suffer long term irreversible damage above this temperature and as such a more expensive alloy steel which maintains its strength at these temperatures is required. Current practice is to use low chromium steels (0.5-2.25 Cr) to convey steam at between 550° C.-580° C. at 160 bar. However, future developments will require temperatures to rise to values in excess of 700° C. and pressures of 360 bar. This will require extensive use of high nickel steels, which can be up to one hundred times more expensive than mild steel.

Such expensive material is required for conveying fluids which must run at temperatures above 700° C. For example, it is well known that power stations which use steam to generate electricity can run more efficiently the higher the temperature of the steam delivered to the power generating turbines. The more efficient the power station, the less fuel required resulting in lower emissions of the greenhouse gas carbon dioxide for example. Conversely, the higher the temperature of the steam the greater the thickness of the high cost alloy steel pipe required.

Generally, power stations convey steam at a temperature of between 500° C. to 600° C. The temperature of the steam conveyed is usually a balance struck between the efficiency of the plant, environmental laws relating to the quantity of allowable gas emissions and the cost of the steel used.

It is an object of the invention to overcome at least some of the problems of the prior art.

According to the invention there is provided a compound pipe for conveying fluid comprising, an inner pipe positioned within an outer pipe, the cross-sectional dimension of the outer pipe being greater than that of the inner pipe, the compound pipe further comprising a first insulating material insulating the inner pipe from the outer pipe, the insulating material and outer pipe comprising a fluid channel.

A compound pipe as as described above, wherein the cross-sectional dimension is a diameter of a circular pipe.

Preferably, the first insulating material is positioned intermediate the inner pipe and outer pipe.

Preferably, the first insulating material substantially encompasses and lies adjacent the inner pipe.

Preferably, the compound pipe comprises a second insulating material substantially encompassing and lying adjacent the outer pipe.

Preferably, the second insulating material is mineral wool or calcium silicate block.

Preferably, the inner pipe comprises an alloy steel, for example, nickel alloy.

Preferably, the inner pipe has voids along its length.

Preferably, the voids of the inner pipe comprise holes encircling the inner pipe and along the length thereof.

Alternatively, the voids are located at ends of adjacent inner pipes where they are attached to one another, for example, at joints of two connecting inner pipes.

Preferably, the first insulating material has a high permeability to water vapour and steam, has good expansion properties and is resistant to fungal growths.

Typical examples of suitable insulation are DARMET™, an insulation made from thin stainless steel shim or ZYAROCK™ is a high strength material made from amorphous silica.

Preferably, the first insulating material adjacent the inner surface of the outer pipe comprises layers of stainless steel shim arranged so as to run parallel to the longitudinal axis of the compound pipe.

Preferably, the surface of the stainless steel shim is dimpled, the dimples providing a clearance between the surface of the stainless steel shim and the outer pipe to form a second channel.

Preferably, the surface of the stainless steel shim is dimpled, the dimples providing a clearance between the surface of the stainless steel shim and the outer pipe.

Optionally, the first insulating material is supported within the outer pipe by supporting structures, for example struts positioned intermediate the first insulating material and outer pipe; the struts providing a clearance between the first insulating material and the outer pipe.

Preferably, the first insulating material is in the shape of annular segments positioned about the inner pipe so that ends of each insulating annular segment lie adjacent to each other.

Preferably, the first insulating material comprises a first and second layer of insulating segments arranged about the inner pipe so that the ends of the insulating segments in the first layer are staggered in relation to the ends of the insulating segments in the second layer.

Preferably, the ends of the insulating portions are connected by means of an expansion joint.

Preferably, the outer pipe comprises a low chrome steel.

According to another aspect of the invention there is provided a method of constructing a compound pipe for conveying a fluid comprising the steps of:
 forming an inner pipe and an outer pipe, positioning the inner pipe within the outer pipe, the diameter of the outer pipe being greater than that of the inner pipe, and insulating the inner pipe from the outer pipe such that the first insulating material and outer pipe comprise a fluid channel.

Preferably, the method includes the step of providing a clearance between the insulating material and the outer pipe.

Preferably, the method further includes the step of insulating the outer pipe.

According to a further aspect of the invention there is provided a method of conveying a fluid comprising the steps of:
 passing the fluid through the inner pipe, allowing migration of a portion of the fluid through the voids of the inner pipe and first insulating material to the channel to condense, and passing the condensate along said channel to drain.

Condensation normally occurs in the channel during start-up when the outer pipe is still cold. This method of conveying the fluid avoids a build up of such condensate within the inner and outer pipes.

According to an embodiment of the invention, a method of conveying high temperature fluid at high pressure is disclosed comprising the steps of providing a compound pipe including an inner non-pressure bearing pipe positioned within an outer pressure bearing pipe, the cross-sectional dimension of the outer pipe being greater than that of the inner pipe, a first insulating material insulating the inner pipe from the outer pipe, the insulating material and outer pipe comprising a fluid channel, and the inner non-pressure bearing pipe being punctuated with through-holes or vents to facilitate pressure equalization by means of fluid flow from the inner non-pressure bearing pipe, and a second insulating material substantially encompassing and lying adjacent the outer pipe; and passing the fluid through the inner pipe; and allowing migration of a portion of the fluid through the holes or vents of the inner pipe to facilitate pressure equalization between the two pipes.

The method may include the further step of draining condensate which forms within the fluid channel. The fluid may be steam. The method may include the step of orienting the compound pipe at a sloping angle. The method may further include the step of insulating the outer pipe.

The invention will be more clearly understood from the following description of an embodiment thereof, given by way of example only with reference to the accompanying drawings in which.

Figure 1:
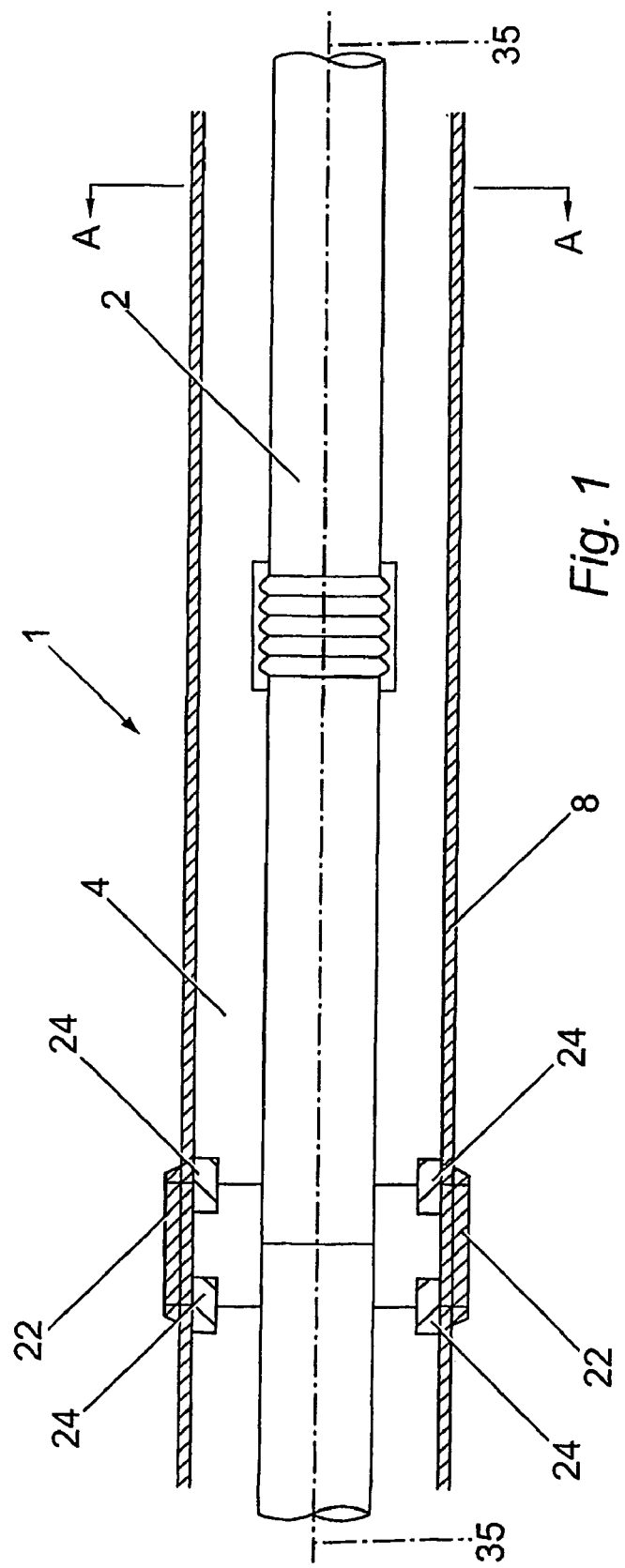
FIG. 1 is a longitudinal cross-sectional view of a compound pipe in accordance with a first embodiment of the invention, the compound pipe being made up of sections connected to each other by way of welded joints.
Figure 2:
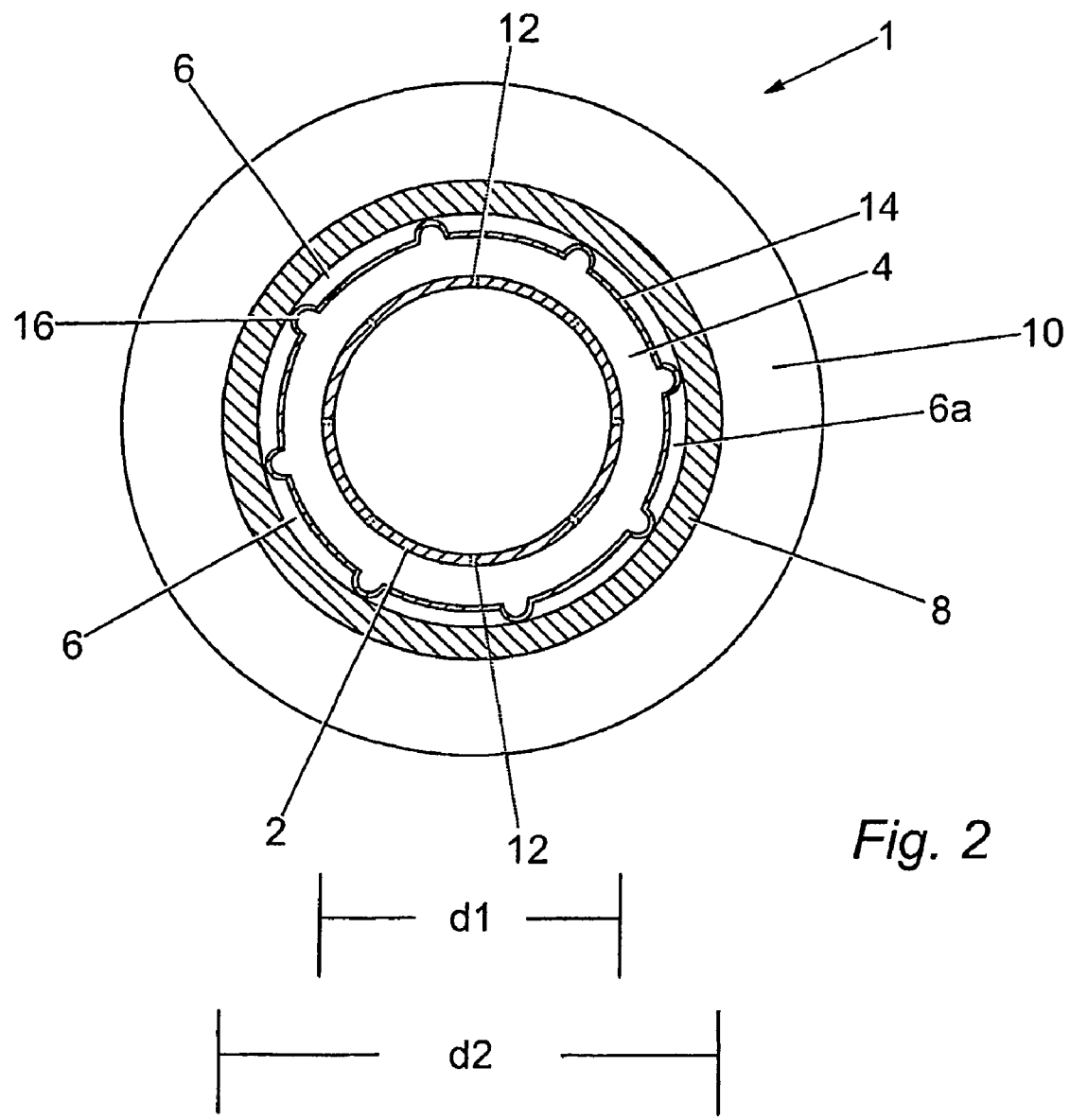
FIG. 2 is a transverse cross-sectional view in the direction of arrows A-A of the compound pipe of FIG. 1.

Referring to the drawings and initially to FIGS. 1 and 2 there is shown a first embodiment of compound pipe of the invention indicated generally by the reference numeral 1.

As shown in FIG. 1 and FIG. 2, the elongate compound pipe 1 is defined about a longitudinal axis indicated by the reference numeral 35. The compound pipe 1 is generally in the form of a sandwich type structure formed about the longitudinal axis 35 made up of an inner non-pressure bearing pipe 2 having a first diameter, $d_1$, and an outer pressure bearing pipe 8 contiguous with the inner non-pressure bearing pipe 2. The outer pressure bearing pipe 8 has a diameter, $d_2$, greater than the diameter of the inner non-pressure bearing pipe 2, $d_1$, so that the inner non-pressure bearing pipe 2 is spaced apart from the outer pressure bearing pipe 8. The inner non-pressure bearing pipe 2 is provided with an inner layer of insulation 4 on its outer surface. The inner layer of insulation 4 extends outwards from the central longitudinal axis 35 towards the outer pressure bearing pipe 8 but terminates short of the outer pressure bearing pipe 8 to define an annular channel 6 co-axial with the longitudinal axis 35 or the compound pipe 1 between the inner layer of insulation 4 and the outer pressure bearing pipe 8. The outer pressure bearing pipe 8 is in turn provided with an outer layer of insulation 10 which extends outwards from the outer pressure bearing pipe 8 from the central longitudinal axis 35 to insulate the outer pressure bearing pipe 8.

The inner non-pressure bearing pipe 2 is formed from a nickel alloy steel and is punctuated throughout with through holes or vents 12 to facilitate pressure equalisation by means of fluid flow from the inner non-pressure bearing pipe 2. The through holes 12 of the inner pipe 2 enable the inner pipe 2 to withstand the pressure of steam being conveyed there along and as such the inner pipe 2 can be a thin walled pipe having a wall thickness ranging from 1 mm to 3 mm.

The nickel alloy steel of the inner pipe 2 has good strength at elevated temperatures.

As indicated above, the inner layer of insulation 4 encompasses the outer surface area of the inner pipe 2. The inner layer of insulation 4 has a low permeability to water vapour and steam, good expansion properties and is also resistant to fungal growths to ensure no fungal growth when the compound pipe 1 is not being used, i.e. during shut-down.

The inner layer of insulation 4 is also formed from a material that does not contaminate the steam and is not corroded by steam thereby ensuring that no piece of corroded inner insulation 4 is broken off and transported by steam to steam driven turbines or the like.

A preferred insulation material is DARMET™ which is made up of a series of layers of dimpled stainless steel shim.

The annular channel 6 is maintained between the inner layer of insulation 4 and the outer pipe 8 by supporting insulation 14 disposed between the inner layer of insulation 4 and the outer pipe 8 to space the inner insulation 4 from the outer pipe 8. This can be seen most clearly in FIG. 2. The supporting insulation 14 is made up of thin stainless steel shim which has outwardly projecting dimples 16 on its outer surface. The outwardly projecting dimples space the inner insulation 4 from the outer pipe 8 and sub-divide the channel 6 into elongate air gaps 6a between the outer pipe 8 and smooth surface of the supporting insulation 14 when viewed in transverse cross-sections as shown in FIG. 2. Condensate which may form on the inner surface of the outer pipe 8 during start up or shut down can therefore flow along the air gaps 6a of the channel 6.

To maintain the operating temperature of the outer pipe 8 within a desired range the outer layer of insulation 10 is positioned about the outer surface of the outer pipe 8. Standard mineral rock or calcium silicate block insulation may be used.

Maintaining the operating temperature of the outer pipe 8 within the particular ranges also limits the degree of condensation on the inner walls thereof which may be caused by the steam migrating from the inner pipe 2, through the holes 12 and inner insulation 4 and supporting insulation 14. This will also minimise corrosion of the pipe 8, the layer of supporting insulating layer 14 and inner layer of insulation 4.

Individual sections of the compound pipe 1 are connected by placing an end of one compound pipe 1 against that of another and welding a cover sheet 22 to adjacent ends thereof. To prevent disintegration of the inner and supporting insulation 4, 14 respectively due to the high temperatures of welding, high temperature resistant insulation 24 is placed beneath the welding area 26. Suitable insulation for this purpose is a ZIRCAR™ ring or ZYAROCK™. Standard expansion bellows may also be placed along the length of each section of compound pipe 1 to allow for the expansion of the compound pipe 1.

Figure 4:
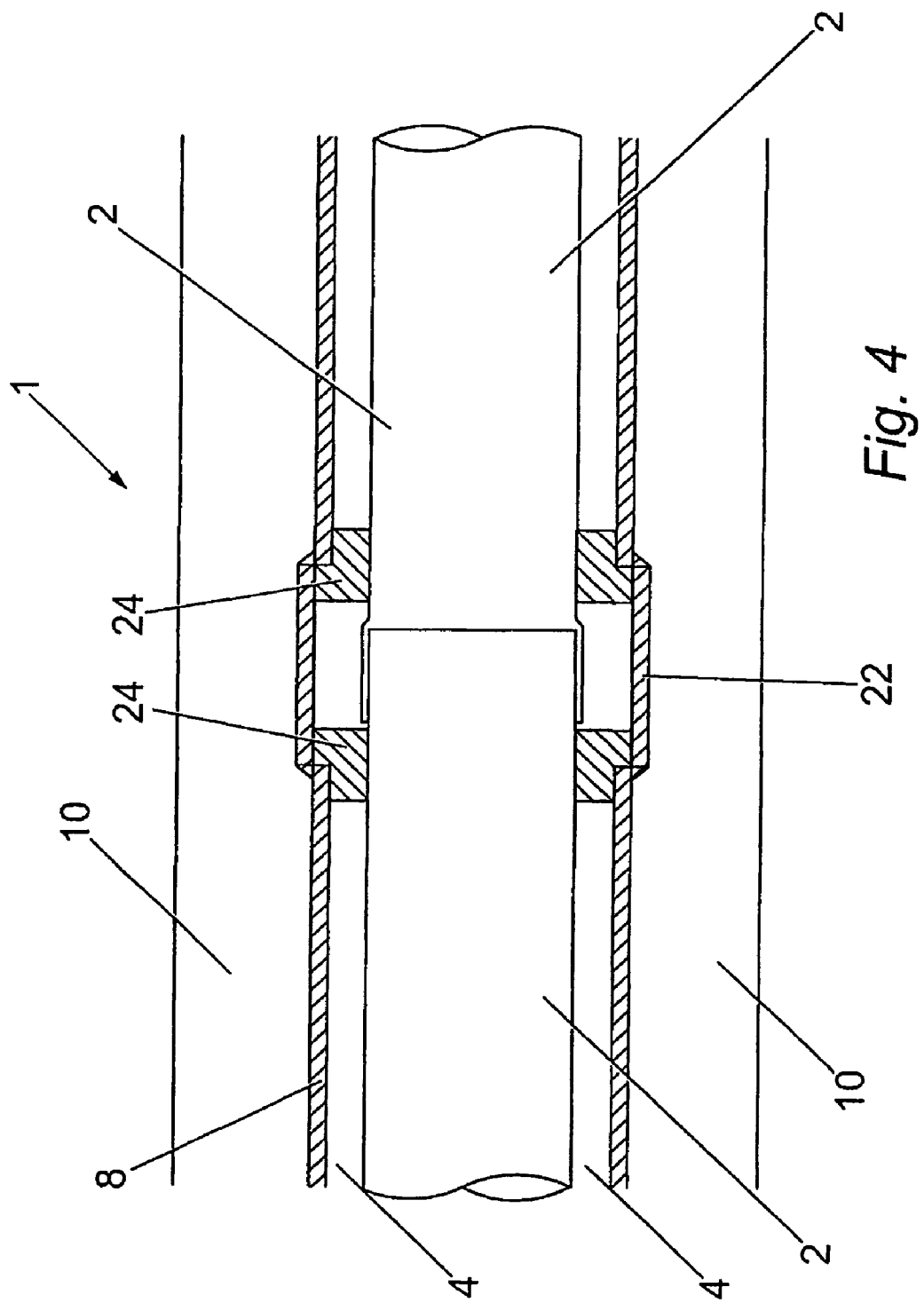
FIG. 4 is a longitudinal cross-section of a compound pipe of FIG. 1 (or FIG. 3) in sections connected by welded joints for low pressure applications.
Figure 5:
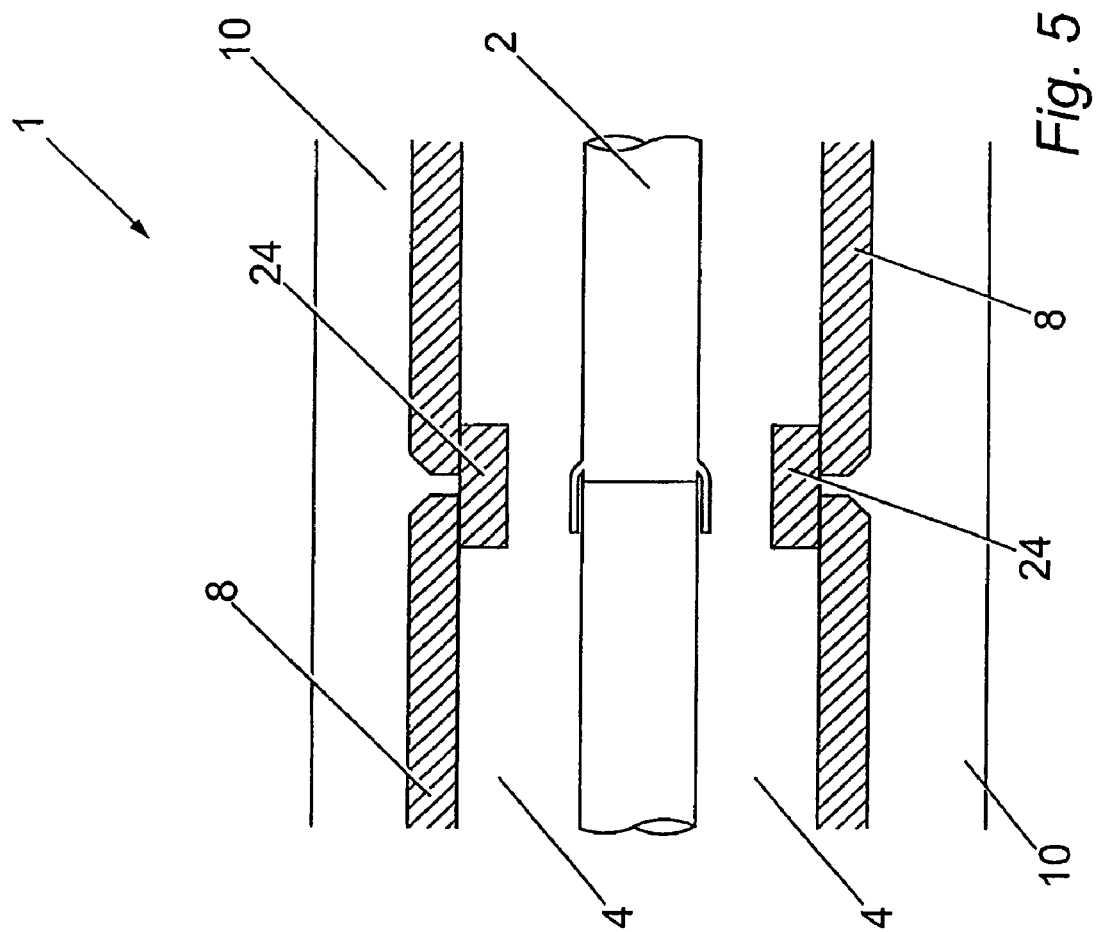
FIG. 5 is a longitudinal cross-section of a compound pipe similar to FIG. 4 connected by welded joints for high pressure application.

In an alternative embodiment of the invention shown in FIG. 4, sections of the compound pipe 1 are connected by sleeking or inserting one end of a compound pipe 1 within the end of another. Again, the ends of the outer pipes 8 are welded together in similar fashion as described above.

In a further alternative embodiment of the invention, the inner non-pressure bearing pipe 2 is made of a ceramic material having a co-efficient of expansion lower than the nickel alloy steel of the present embodiment.

Figure 6:
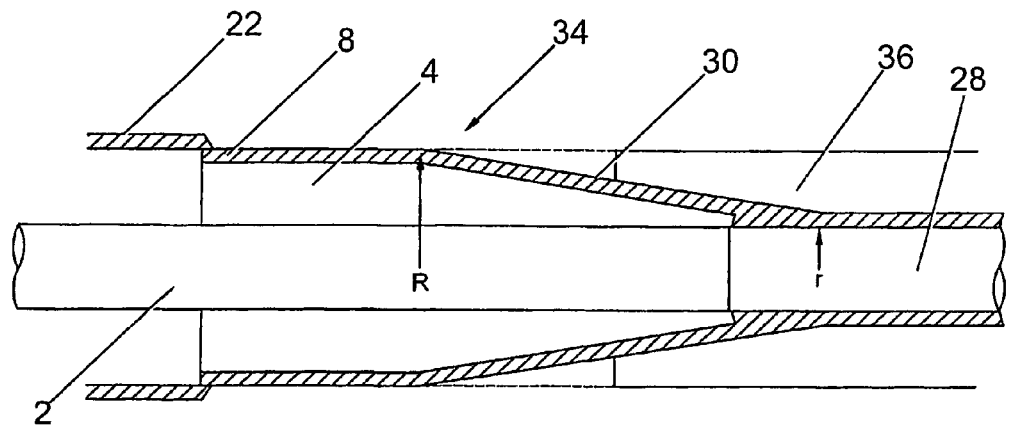
FIG. 6 is a longitudinal cross-section of an end portion of the compound pipe of FIG. 1 or FIG. 3 attached to a conventional pipe at an adaptor piece.
Figure 7:
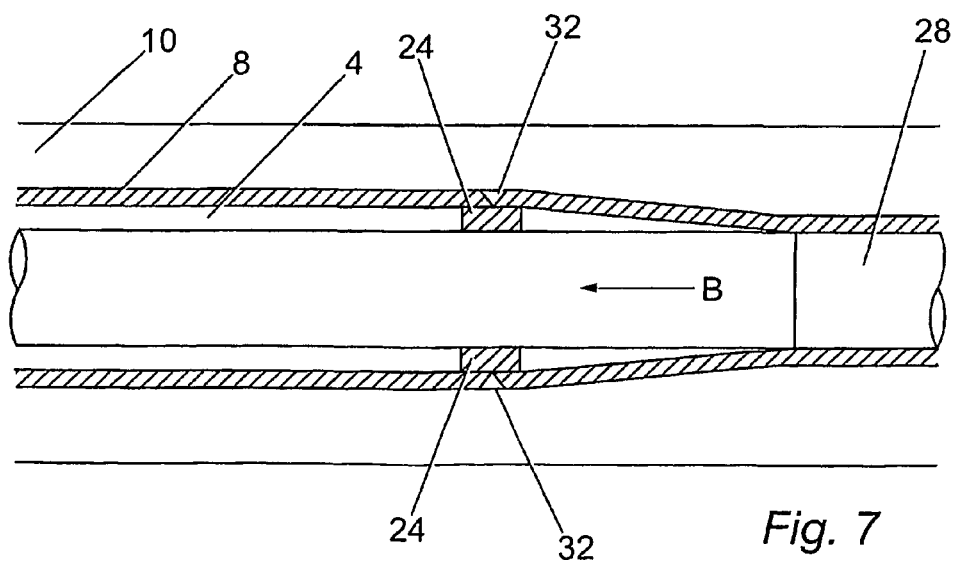
FIG. 7 is a longitudinal cross-section of an end portion of the compound pipe of FIG. 1 or FIG. 3 attached to a conventional pipe at an alternative type of adaptor piece.

As shown in FIG. 6, an adaptor piece 30 is employed to fix an end of the compound pipe 1 to a conventional pipe 28. The adaptor piece 30 is conical in shape having a large radius R generally equal to that of the outer pipe 8, and a small radius r generally equal to that of the conventional pipe 28. As shown in FIG. 6, large and small ends 34 and 36 of the adaptor 30 can be welded to the compound pipe 1 and conventional pipe 28 respectively in a similar manner as described above. The arrow B indicates the typical direction of travel of steam. The adaptor piece 30 does not have insulation at the large end 34 adjacent to compound pipe 1. This equalises the temperature of the adaptor piece 30 with that of the outer pipe 8 so as not to create stresses across the weld 32. To provide for bends, the compound pipe 1 is manufactured so that the inner surface of the outer pressure bearing pipe 8 and the outer surface of the inner layer of insulation 4 are defined by the same mean radius. The insulated inner non-pressure bearing pipe 2 can therefore be slid into the outer pressure bearing pipe 8 as shown on FIG. 14. The inner layer of insulation 4 is segmented, similar to a "lobster back" bend. Hence the clearance between the layer of insulation 4 and the inside of the outer pressure bearing pipe 8 at the bend may have to be increased slightly to allow the inner pipe 2 to slide smoothly within the outer pipe 8 and around the bend. This may mean that the outer pipe 8 at the bend will have a slightly different bore or a slightly different outside diameter. Generally, the outer diameter in pipelines at a bend is often different to allow for a thicker wall to withstand the higher stresses in the bend.

Figure 14:
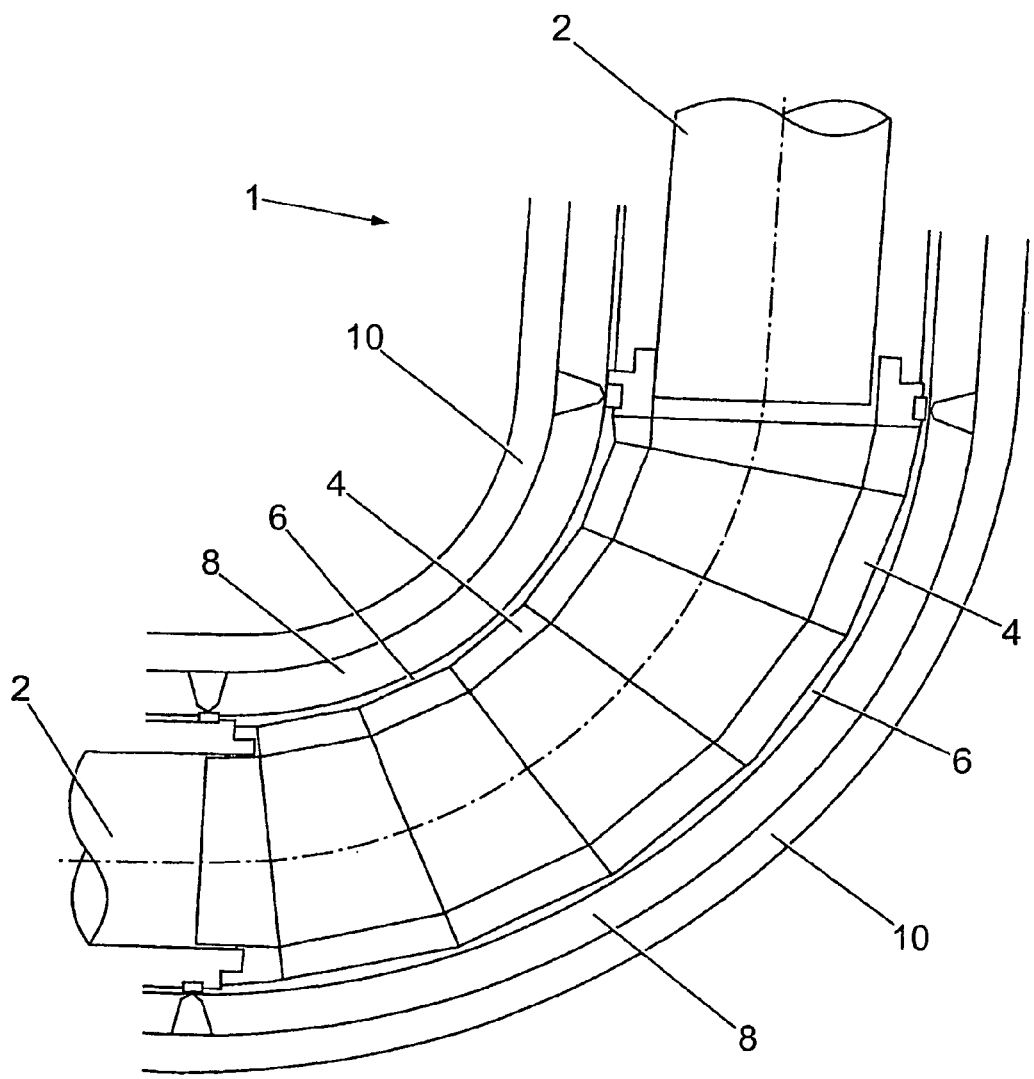
FIG. 14 is a longitudinal cross-sectional view of a bend portion of the compound pipe.

FIG. 14 shows the proposed arrangement for a 90° bend.

Figure 15:
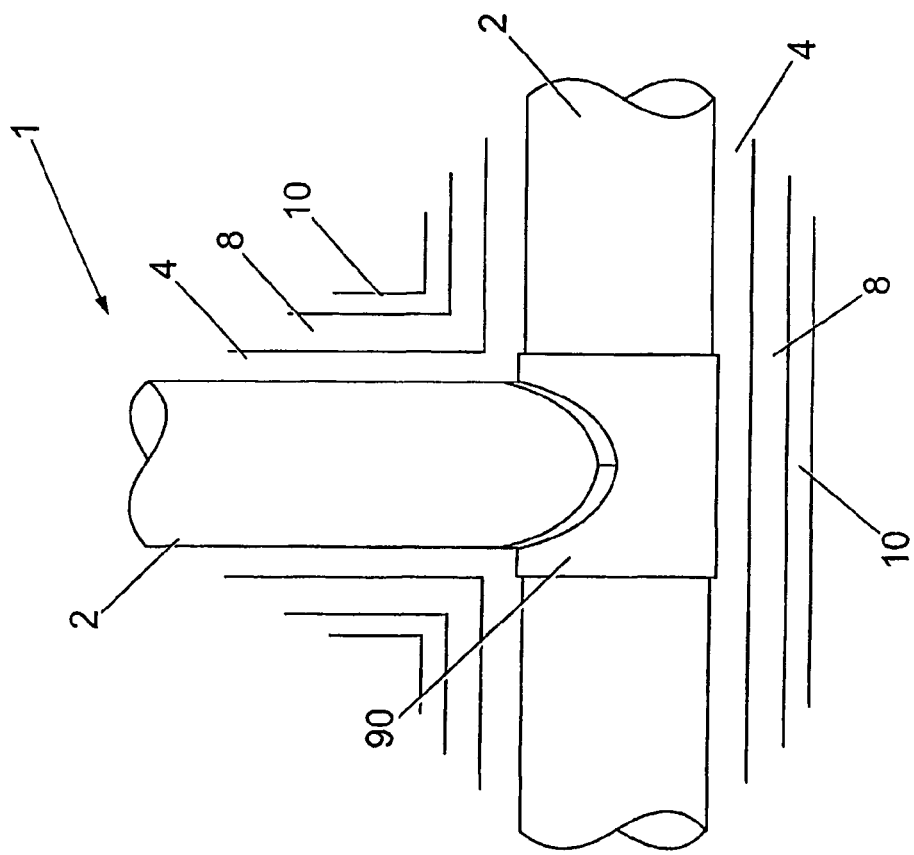
FIG. 15 is a longitudinal cross-sectional view showing the intersection of two compound pipes to form a T-piece.
Figure 16:
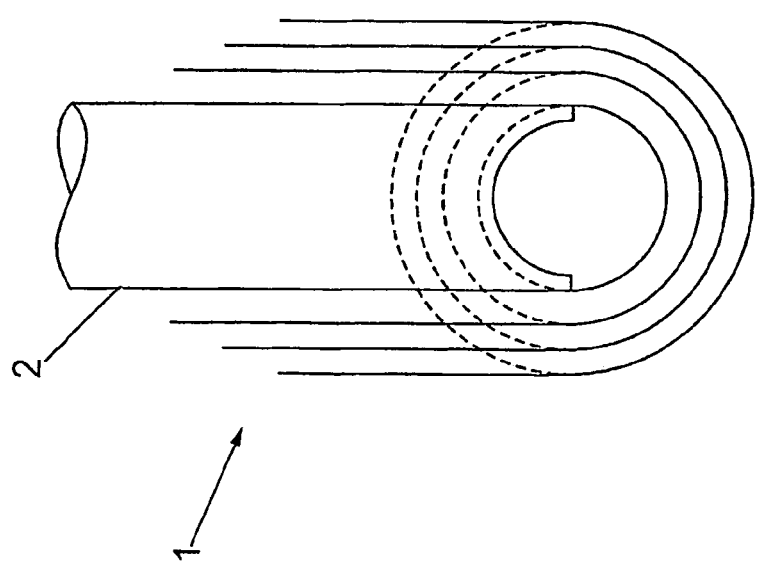
FIG. 16 is a cross-sectional view from one end of the compound pipe of FIG. 15.

T-pieces are an important part of pipelines. FIG. 15 shows a proposed construction of a T-piece where one compound pipe is inserted into another. The insulated inner non-pressure bearing pipe 2 of the first compound pipe is inserted through a hole in the side of the second compound pipe and into the inner non-pressure bearing pipe 2 thereof. A sliding sleeve (not shown) is fitted over the inner pipe 2 to allow for expansion. For 1:1 T-pieces, (i.e. when the two compound pipes are of the same diameter), this sleeve may have a short branch on the side to locate the inner pipe 2 to form a sort of "socket" 90. The end of the inner pipe 2 of the first compound pipe is shaped to avoid blocking the inner pipe 2 of the second compound pipe into which it leads. The inner pipes 8 are anchored at ends where they join onto other compound pipes.

In an alternative embodiment, a Y-junction can use the same approach as the T-junction. For example, a Y-shaped guide can be inserted into the second compound pipe and ducts in the small branch offered up. If required limitations can be placed on the size of the branch relative to the size of the main or second compound pipe.

There is a considerable advantage to be gained if manifolds and headers are built using the compound-pipe construction of the invention. The headers can form an extension of the compound pipe construction.

Figure 17:
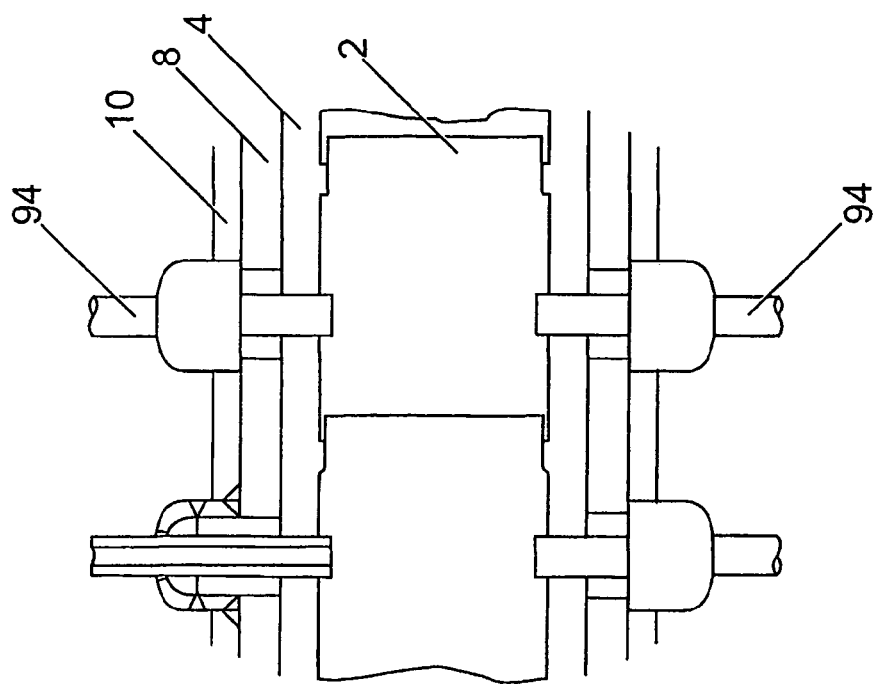
FIG. 17 is an end view of a header as an extension of the compound pipe, the header also being of the compound pipe type construction.
Figure 18:
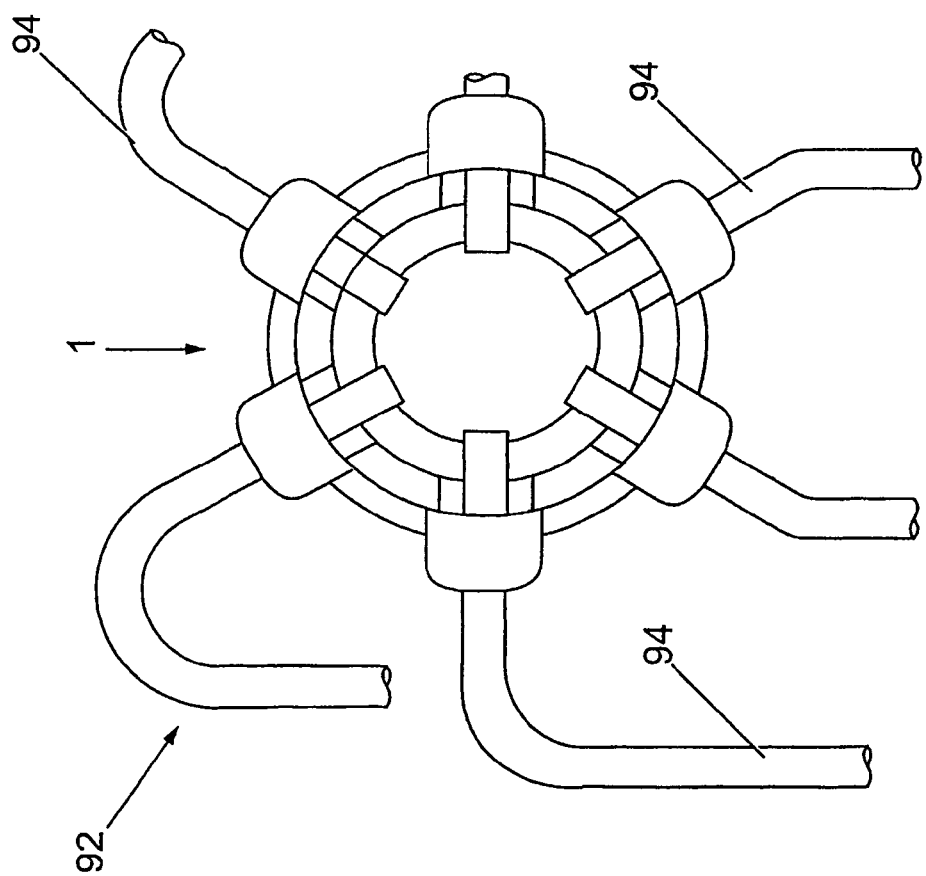
FIG. 18 is a longitudinal cross-sectional view of the compound pipe of FIG. 17.

Of the two, it is easier to use manifolds as the number of pipes joining them is fewer. FIG. 17 shows a suggested header construction 92. The number of inlet pipes 94 of the header 92 is limited to 6 in one plane due to the limitations of ligament size. The ligament size is the distance between two adjacent inlet pipes 92 whose openings create stresses in the inner pipe 2 and outer pipe 8. The closer the adjacent inlet pipes 92 are to each other the greater the stress created in that portion of the pipe 2 and 8 therebetween. However, to compensate for this the inlet pipes 92 can be closer together in the axial direction than is normally the case.

Valves are an important part of pipelines and it would be useful if these were also made from low temperature materials. This could be achieved by passing a cooling medium through channels in the internal components.

Figure 3:
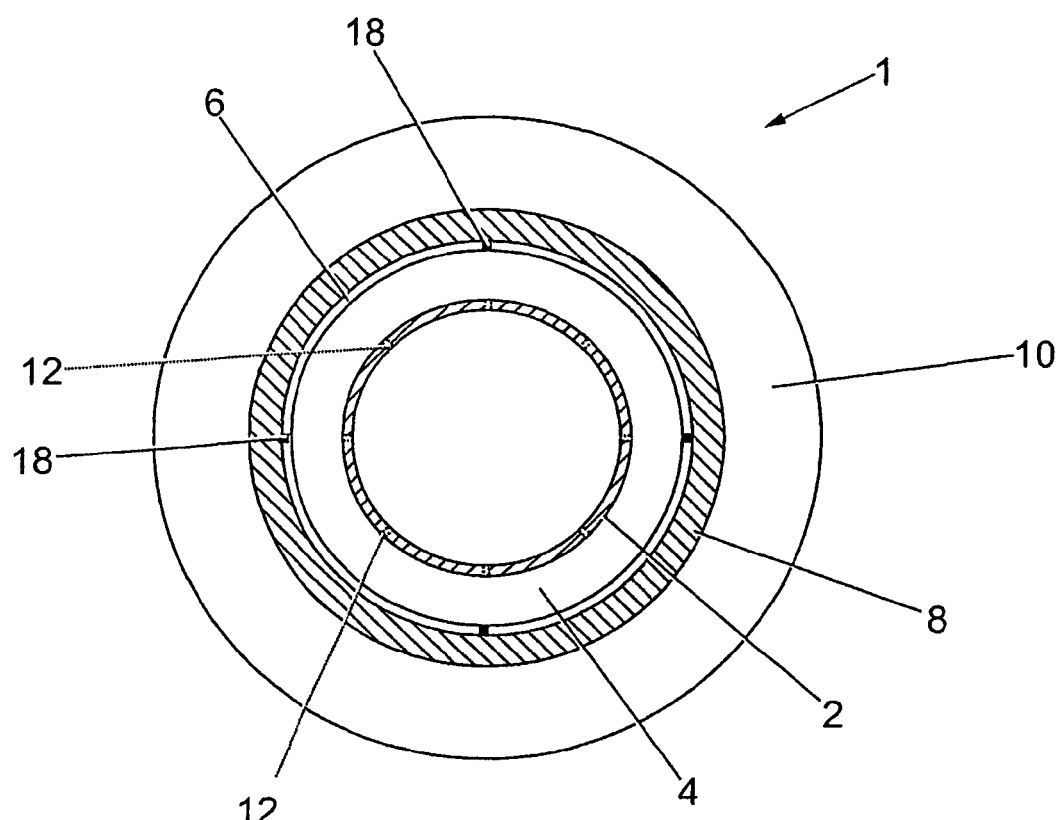
FIG. 3 is a transverse cross-sectional view similar to FIG. 2 of a second embodiment of a compound pipe of the invention showing the first insulating material supported within the outer pipe by struts.

It will be appreciated that various other suitable alloy steels may be used, to reduce the cost of the inner layer of insulation 4. It is also possible to apply this technique to higher temperatures (1200° C.) by using an insulation made of ceramic material or ODS (Oxide Dispersion strengthened) alloys. The channel 6 can also be maintained by arranging support struts 18 along the length of the compound pipe between the inner insulation 4 and the outer pipe 8 as shown in FIG. 3 where like numerals indicate like parts. In this embodiment supporting insulation 14 is not necessary.

In general inner pipe 2, layer of inner insulation 4 and supporting insulation 14 are positioned to fit snugly within the outer pressure bearing pipe 8. The pipe 8 is made of a carbon manganese or low chrome steel.

In use, the compound pipe 1 is orientated at a sloping angle so that such condensate may flow under gravity to drainage points (not shown) positioned at intervals along the compound pipe 1. This helps prevent corrosion which could be caused to the outer pipe 8 by such condensate build up. For the purposes of the present example, the compound pipe 1 is used to convey steam with a temperature in the region of 600° C.-1000° C.

Theoretically, the pipe 8 can be run at room temperature in which case, supporting steel structures would not have to cope with movement due to expansion.

To achieve this however a large diameter outer pipe 8 would be necessary. However, it is more practical to limit the thickness of the inner insulating layer 4 and inner diameter of the outer pipe 8 so that the outer pipe 8 operates at a temperature below that which would introduce creep stresses in the material of the pipe 8.

Figure 11:
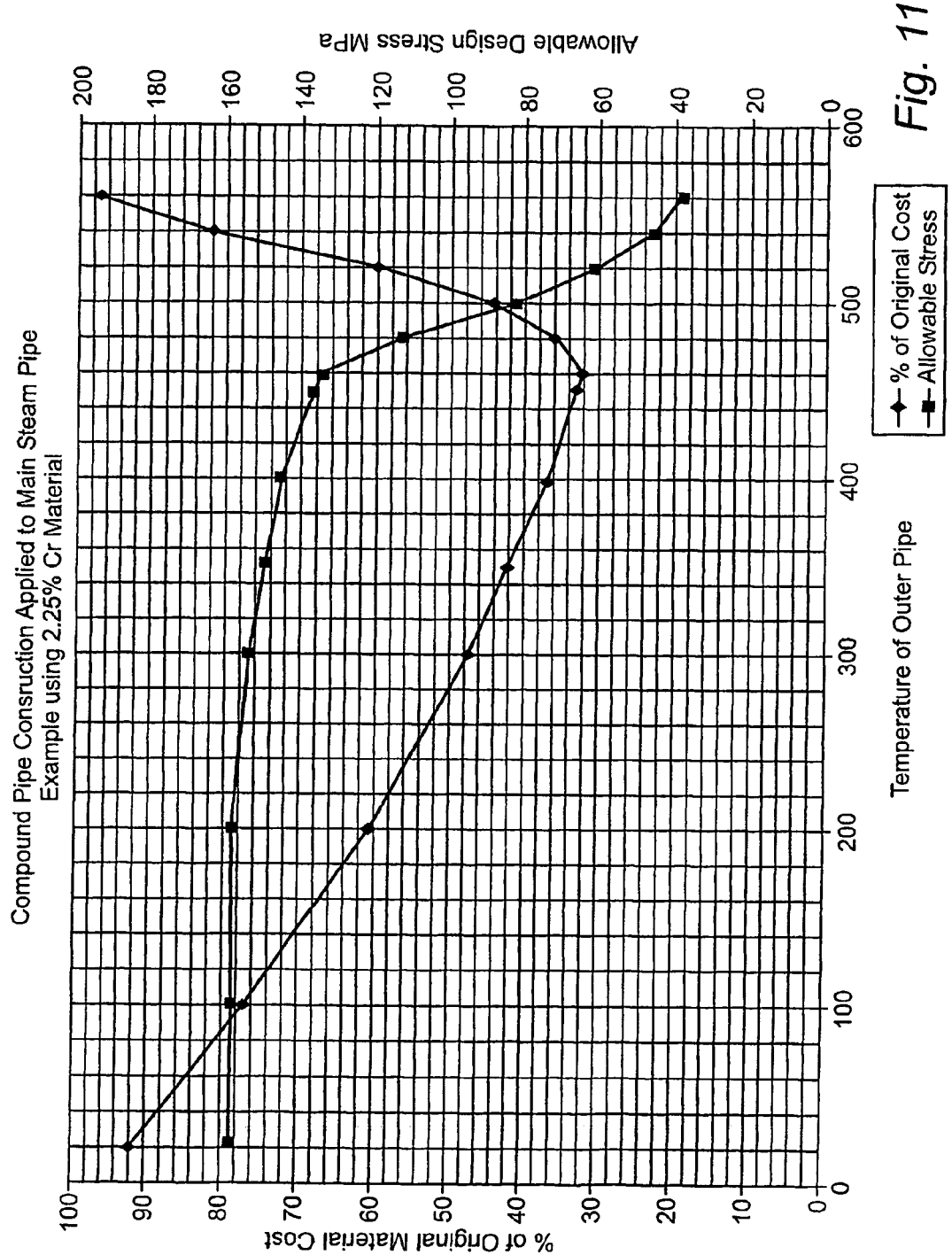
FIG. 11 is a graph showing the relationship between the cost of material used for the outer pipe, its running temperature and the allowable stresses thereon.

A balance can be struck between the running temperature of the outer pipe 8 and its cost so that it may operate at a temperature below that which would introduce creep stresses in the material chosen and this is shown most clearly in FIG. 11. In this example, the material is a 2.25 chromium steel.

A typical example of the parameters and operating conditions of the compound pipe 1 are shown below in Table 1.

TABLE 1

| Parameter | Operating Conditions |
| --- | --- |
| Thickness of inner pipe 2 | 1 mm |
| Thickness of inner insulation 4 | 50 mm |
| Width of channel 6 | 5 mm |
| Thickness of outer pipe 8 | 50 mm |
| Thickness of outer insulation 10 | 45 mm |
| Pressure of steam | 360 bar |
| Operating temperature of inner pipe 2 | 700° C. |
| Operating temperature of outer pipe 8 | 400° C. |
| Inner diameter of inner pipe 2 | 200 mm |
| Inner diameter of outer pipe 8 | 302 mm |

In an alternative embodiment of the invention, the inner insulating layer 4 may be comprised entirely of suitable high temperature ceramic type insulation.

Figure 8:
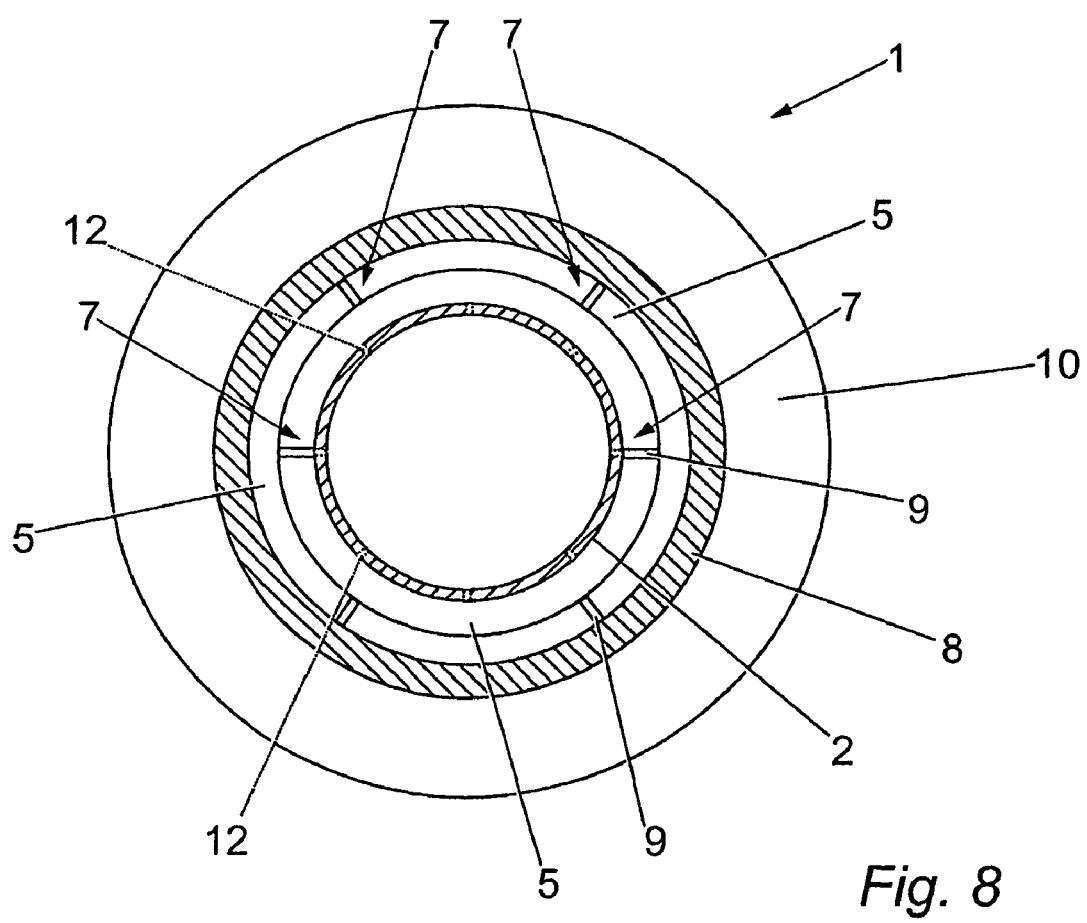
FIG. 8 is a transverse cross-sectional view similar to FIG. 3 of a further embodiment of a compound pipe of the invention showing a dual layer of insulating annular segments nested about the inner pipe and connected to each other by way of expansion joints.
Figure 9:
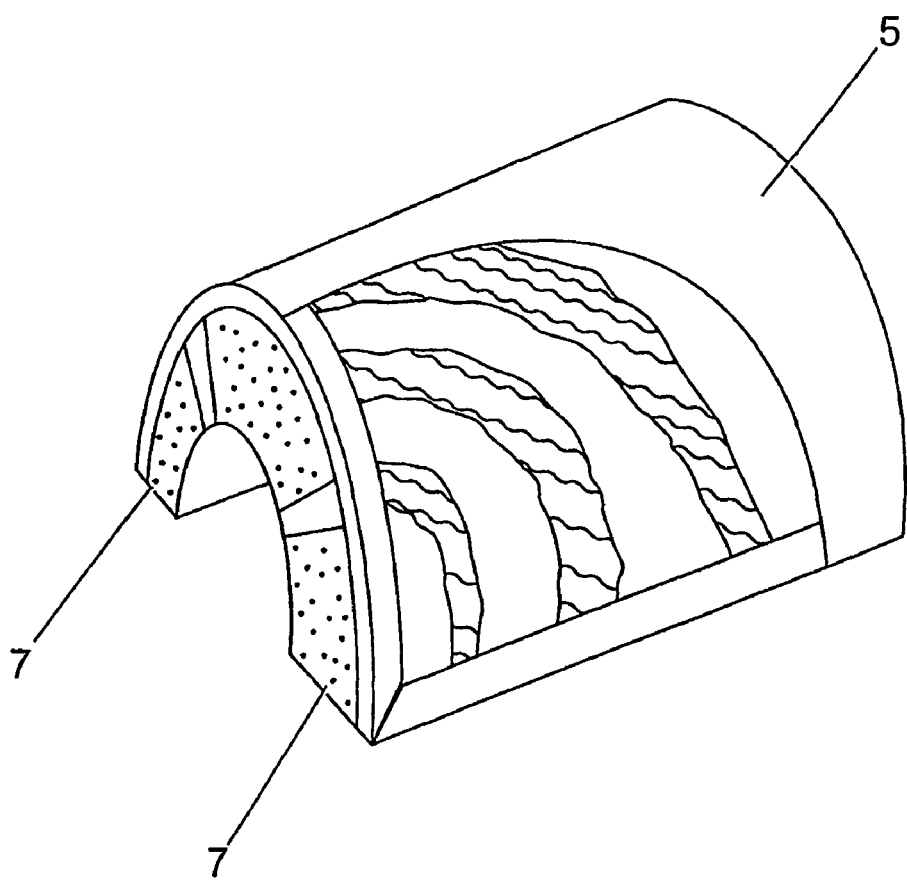
FIG. 9 is a perspective view from the side and above of an insulating segment of FIG. 8 having part of its upper portion cut away.
Figure 10:
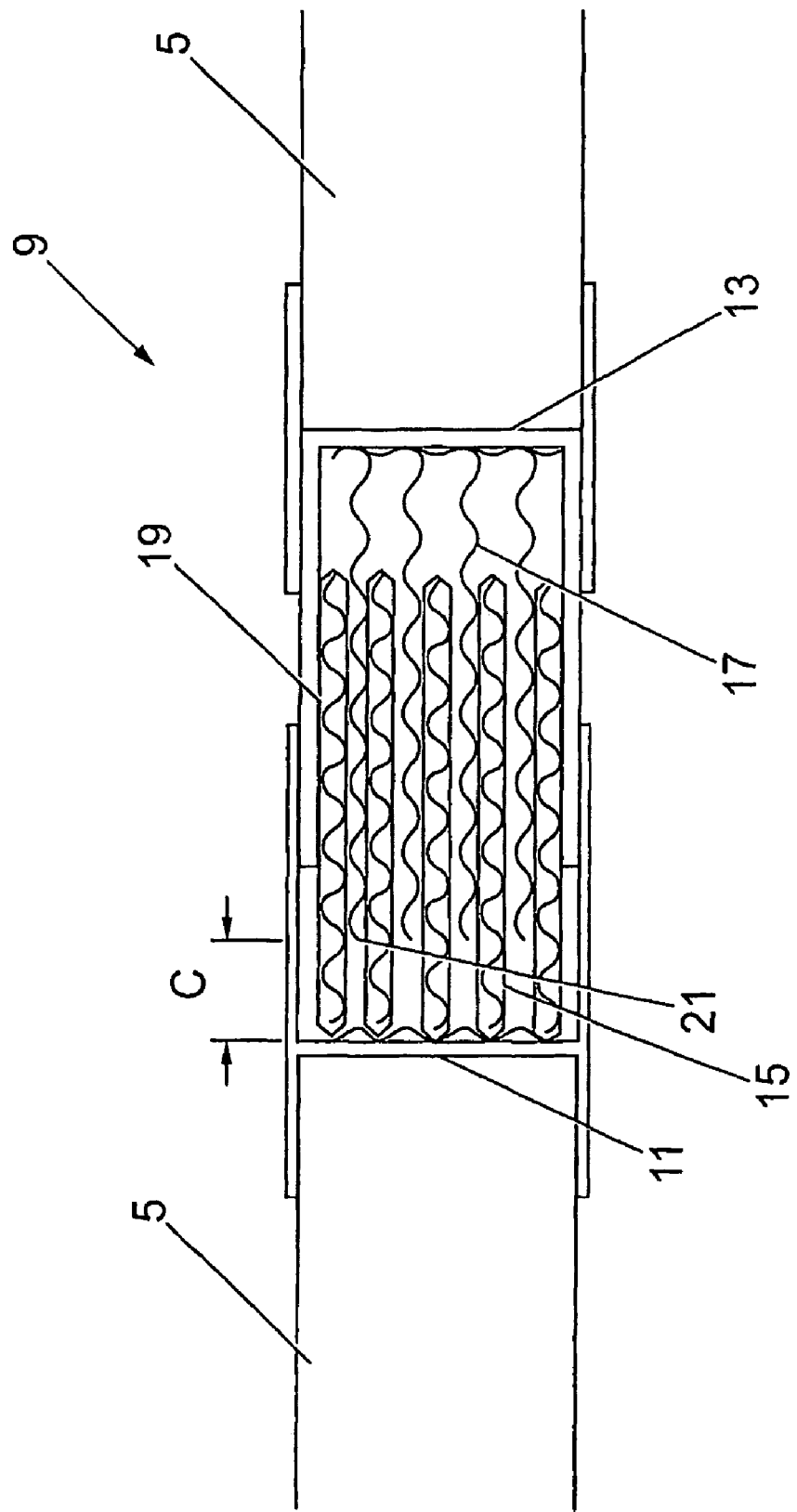
FIG. 10 is a cross-sectional view of the expansion joint shown in FIG. 8.

In a further alternative embodiment of the invention the inner insulating layer 4 may be comprised of individual insulating annular segments 5. Ends 7 of the segments 5 are held together about the inner pipe 4 by expansion joints 9. This is shown most clearly in FIG. 8. The expansion joints comprise two end plates 11 and 13 from each of which extend in a lateral direction corrugated stainless steel shim fins 15 and 17 respectively. A clearance, indicated by the letter C in FIG. 10, is provided between the ends 21 of the fins 17 and the plate 11 to allow for expansion. The fins 15 of plate 11 are enclosed within a layer of foil 19 and are staggered with respect to the fins 17 of the plate 13 to allow the fins 15 and 17 to more easily slide over each other during expansion and contraction of the joint 9. The joint 9 may include a high temperature spring (not shown) to hold the expansion joint 9 more securely in contact with adjacent insulating annular segments 5.

The expansion joint 9 can be made from stainless or inconel woven blanket such as BEKITHERM™ which is a metal fibre needle felt material. BEKITHERM™ is flexible at high temperatures and allows for relative movement between the insulating segments 5.

As in the previous embodiments, the insulating annular segments 5 are permeable to water vapour and steam. As such, condensation which may form at the inner surface of the outer pipe 8, for example, during start-up when the outer pipe 8 is cooled and condensation which may occur in the insulation itself will drain away through small channels (not shown) in the insulation. This is assisted by orientating the compound pipe at an angle.

It will be appreciated that the operating temperature of the outer layer of insulation 10 may run at a temperature of up to 100° C. and as such it would be appropriate to provide a safety guard about the insulation 10.

It will also be appreciated that there will be a pressure drop along the pipe which not only will cause flow in the pipe but will also cause a small flow in the inner insulation 4 in an axial direction. This could transport heat from the inner pipe 2 to the outer pipe 8. To limit the heat transferred in this manner from the inner pipe 2 to the outer pipe 8, seals (not shown) may be provided at regular intervals along the compound pipe 1 between the inner pipe 2 and outer pipe 8. These may be spring loaded to maintain contact with the outer pipe 8 and may be associated with joints in the compound pipe 1.

The advantages of the invention are many. The compound pipe 1 provides a cheaper alternative pipe structure capable of conveying steam at high temperatures and pressure for example temperatures over 700° C. and pressures of 360 bar. The cost of piping for conveying fluids at such high temperatures using the structure of the compound pipe of the invention can be reduced by a factor of 50 to 100. The compound pipe also facilitates the draining of condensed steam/condensate along the channel 6 between the inner pipe 2 and the outer pipe 8. Orientation of the compound pipe of the invention at an angle also prevents saturation of insulation disposed between the inner pipe 2 and the outer pipe 8. The insulation layer 4 is more efficient and hence can be made thinner when the outer pipe 8 is at a temperature greater than the saturation temperature of the steam. In this case, the diameter of the pipes 2 and 8 can be smaller, reducing the weight of the pipes 2 and 8 and hence reducing the degree of structural support necessary for the pipes 2 and 8. Condensation which may form during the start-up when the outer pipe 8 is cooled will drain away through small channels (not shown) in the insulation. This is assisted by orientating the compound pipe at an angle.

Figure 12:
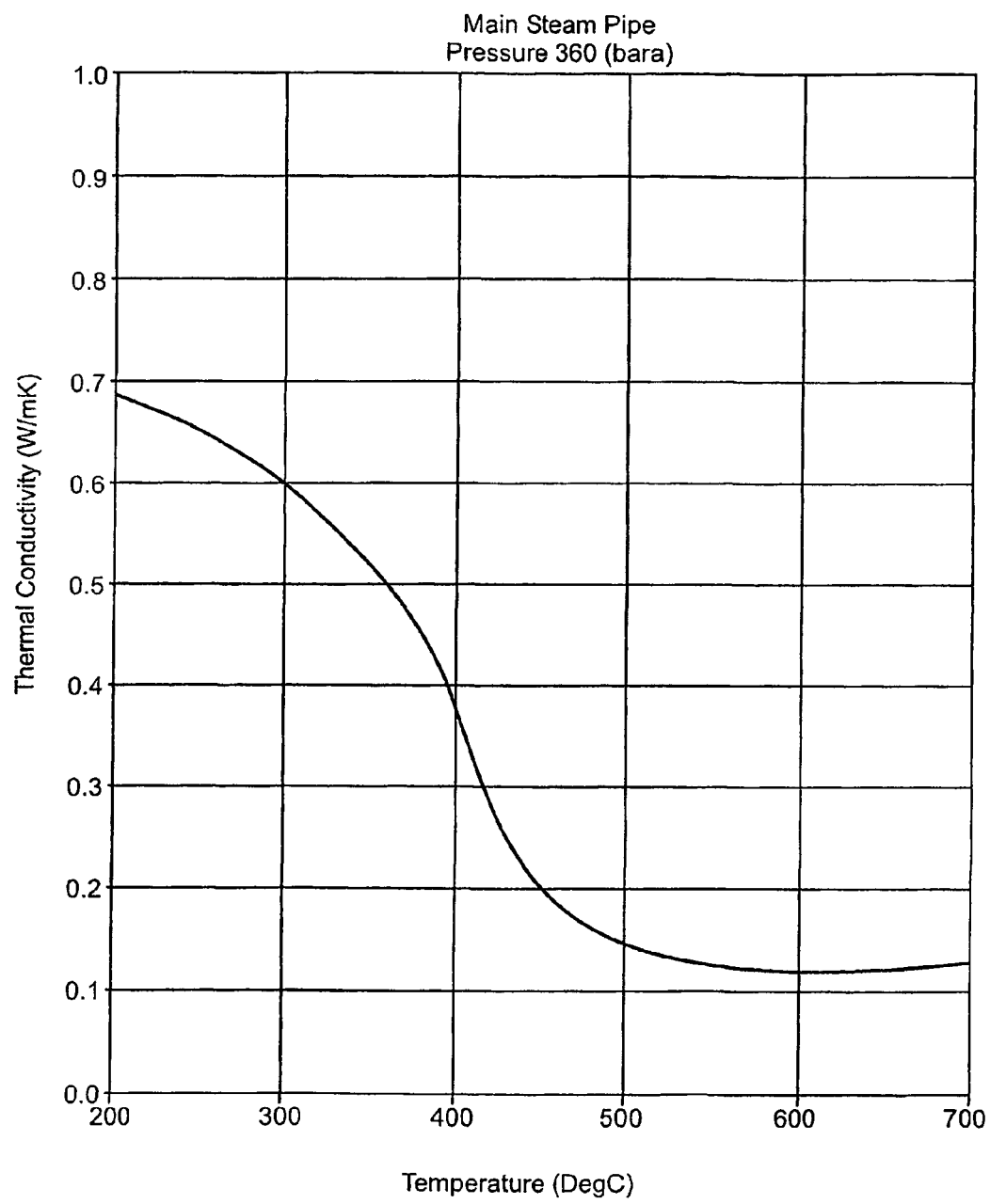
FIG. 12 is a graph showing the relationship between the temperature of steam and its insulating properties.
Figure 13:
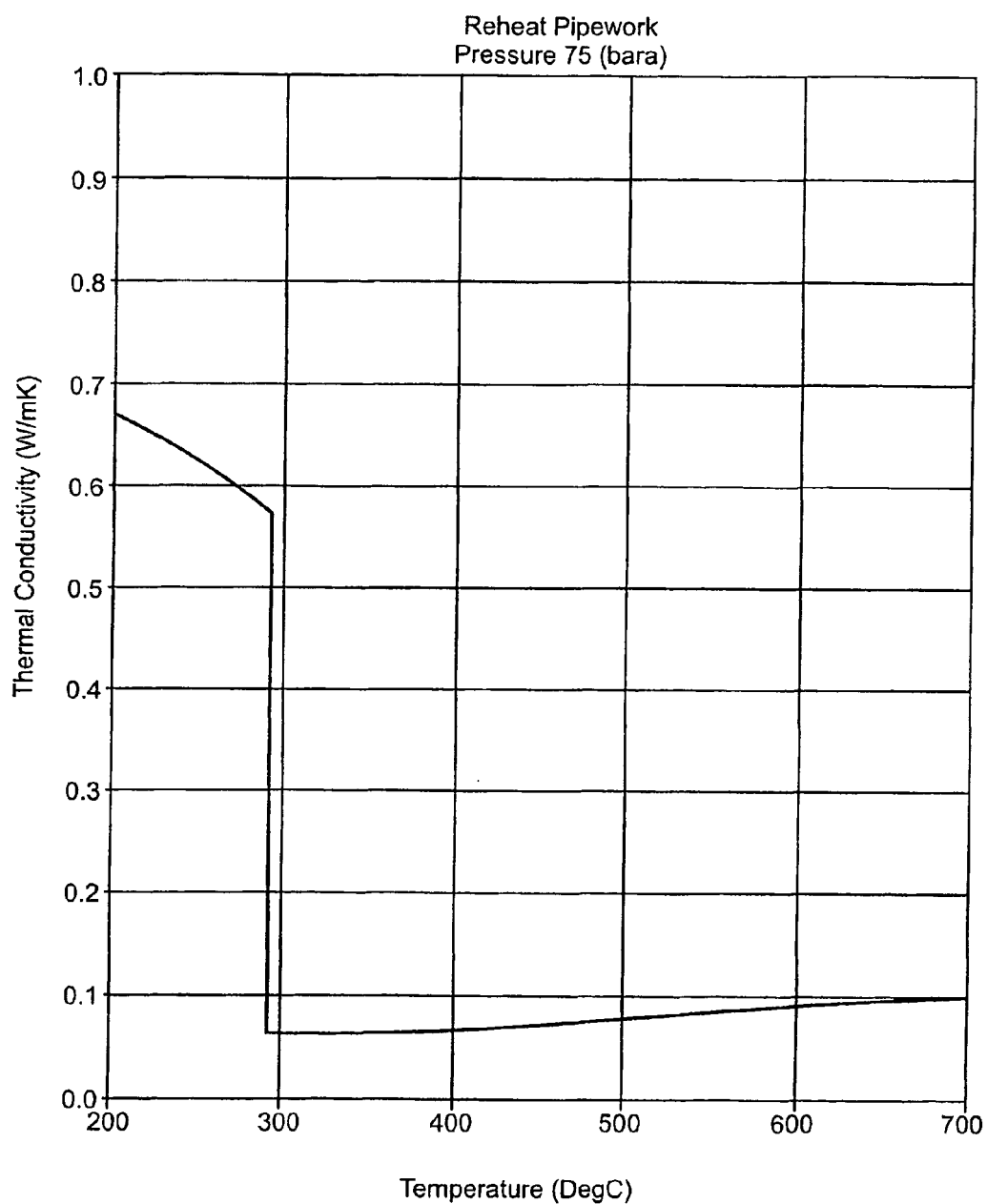
FIG. 13 is a graph similar to FIG. 12 showing the relationship between the temperature of steam and its insulating properties at a different pressure.

A portion of the steam which migrates through the through holes 12 also becomes trapped within the inner layer of insulation 4 which affects the insulating capacity of the insulating layer 4. FIG. 12 illustrates that the insulating properties of steam is best when its temperature within the inner insulation 4 is approximately 500° C. at an operating pressure of 360 bar. The insulating properties of steam will of course be different when its temperature and/or pressure is changed. This is shown most clearly in FIG. 13.

Moreover, the provision of insulation on the outer pressure pipe facilitates the operation of the outer pressure boundary at optimum temperatures i.e. temperatures at below creep values but sufficiently high to prevent formation of condensation. The steam at these temperatures has optimum insulating properties.

It is important when the compound pipe 1 is in operation to monitor that the inner insulating layer 4 is working adequately. This will ensure that the outer pipe 8 is operating within an optimum temperature range. Where no outer layer of insulation 10 is used, this rise in temperature can be picked up by remote infrared cameras. Where the outer layer of insulation 10 is used temperatures may be monitored under the outer layer of insulation 10 using distributed temperature measurement systems.

An example of this type of measurement system uses a fibre optic cable. The cable is wound around the outside of the pipe 8 in a spiral pattern. Laser light is passed down the cable and light is reflected back to the source from all points along the cable. From the frequency and the time of flight of the reflected signal the temperature can be measured at any point along the cable to an accuracy of 1° C. and a spatial accuracy of 1 meter.

A further example of this type of system uses mineral insulated cable similar to the type used in thermocouples. The mineral insulation used is a special mix of salts which has a specific eutectic temperature. When a point on the cable reaches this temperature, the salts melt and short circuit the cable causing a fault signal to be generated. The position of the fault can be determined by time of flight techniques or by network analysis.

Alternatively an IOF (Incredibility Of Failure) argument could be employed to prove that, by use of a high integrity insulation, careful construction and good quality control, the internal insulation will not fail.

The compound pipe of the invention also finds particular application in boiler plants and the like.

The compound pipe of the invention also finds application in re-heat pipeworks, superheater manifolds and reheater manifolds. The compound pipe of the invention also finds application in hot oil applications e.g. on the sea bed and the like.

It will be appreciated that the inner pipe 2 and outer pipe 8 do not necessarily have to be of circular cross-section but can be of any suitable cross-section, for example, square or oval.

The embodiments are not limited as hereinbefore described but may be varied within the scope of the invention.

The invention claimed is:

1. A compound pipe assembly comprising:
    an inner non-pressure bearing pipe positioned within an outer pressure bearing pipe, the diameter of the outer pipe being greater than that of the inner pipe,
    a first insulating material insulating the inner pipe from the outer pipe, the insulating material and outer pipe a fluid channel, and
    the inner non-pressure bearing pipe being punctuated with through-holes or vents to facilitate pressure equalization by means of fluid flow from the inner non-pressure bearing pipe,
    a second insulating material substantially encompassing and lying adjacent the outer pipe,
    wherein the first insulating material comprises an insulation made from stainless steel shim,
    wherein the surface of the stainless steel shim is dimpled.

2. A compound pipe assembly as claimed in claim 1, wherein the first insulating material further comprises supporting insulation also having dimples, which define the fluid channel.

3. A compound pipe assembly as claimed in claim 1 further comprising at least one component selected from a group consisting of a T-piece, a Y-junction, and a manifold pipe.

4. A compound pipe assembly as claimed in claim 1 wherein the compound pipe assembly is adapted to transport high temperature fluid at high pressure.

5. A compound pipe as claimed in claim 4 wherein the high temperature fluid is steam or oil.

6. A compound pipe assembly as claimed in claim 1 for use in boiler plants.

7. A compound pipe assembly as claimed in claim 1, wherein the inner and outer pipes have a circular cross-section.

8. A compound pipe assembly as claimed in claim 1, wherein the first insulating material substantially encompasses and lies adjacent the inner pipe.

9. A compound pipe assembly as claimed in claim 1, wherein the second insulating material is mineral wool or calcium silicate block.

10. A compound pipe assembly as claimed in claim 1 in which the inner pipe has a wall thickness of between approximately 1 and 3mm.

11. A compound pipe assembly as claimed in claim 1, wherein the inner pipe comprises an alloy steel.

12. A compound pipe assembly as claimed in claim 11, wherein the alloy steel is nickel alloy steel.

13. A compound pipe assembly as claimed in claim 1, wherein the inner pipe has voids along its length.

14. A compound pipe assembly as claimed in claim 13, wherein the voids of the inner pipe comprise holes along the length thereof.

15. A compound pipe assembly as claimed in claim 13, wherein the voids comprise holes and are located at an end of the inner pipe and an end of an adjacent inner pipe.

16. A compound pipe assembly as claimed in claim 13, wherein the voids comprise holes and are located at a joint between the inner pipe and another inner pipe.

17. A compound pipe assembly as claimed in claim 1 in which expansion bellows are placed along the inner pipe.

18. A compound pipe assembly as claimed in claim 1, wherein the first insulating material has a permeability to steam.

19. A compound pipe assembly as claimed in claim 1 in which the first insulating material is formed from a material that does not contaminate the steam and is not corroded by the steam.

20. A compound pipe assembly as claimed in claim 1, wherein the first insulating material is resistant to fungal growths.

21. A compound pipe as claimed in claim 1, wherein the stainless steel shim is arranged so as to run parallel to the longitudinal axis of the compound pipe assembly.

22. A compound pipe assembly comprising:
    an inner non-pressure bearing pipe positioned within an outer pressure bearing pipe, the diameter of the outer pipe being greater than that of the inner pipe,
    a first insulating material insulating the inner pipe from the outer pipe, the insulating material and outer pipe a fluid channel, and
    the inner non-pressure bearing pipe being punctuated with through-holes or vents to facilitate pressure equalization by means of fluid flow from the inner non-pressure bearing pipe,
    a second insulating material substantially encompassing and lying adjacent the outer pipe,
    wherein the first insulating material comprises annular segments, and wherein the ends of adjacent annular segments are connected by means of an expansion joint.

23. A compound pipe assembly as claimed in claim 22, in which the expansion joint comprises a pair of end plates, from each of which extend in a lateral direction stainless steel shim fins, wherein the fins of one of the plates are staggered with respect to the fins of the other plate to allow them slide over each other during expansion and contraction of the joint.

24. A compound pipe assembly as claimed in claim 22, wherein the first insulating material comprises amorphous silicone.

* * * * *